(12) United States Patent
Yoshida et al.

(10) Patent No.: US 6,702,406 B2
(45) Date of Patent: Mar. 9, 2004

(54) TRAVEL GEAR OF CRAWLER WORK VEHICLE

(75) Inventors: Tsuyoshi Yoshida, Katano (JP); Kazuyuki Onohara, Yawata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/158,064

(22) Filed: May 31, 2002

(65) Prior Publication Data

US 2002/0185915 A1 Dec. 12, 2002

(30) Foreign Application Priority Data

Sep. 11, 2001 (JP) ........................................ 2001-176330

(51) Int. Cl.[7] ............................................ B62D 55/088
(52) U.S. Cl. ........................ 305/100; 305/107; 305/116; 305/132
(58) Field of Search ................................ 305/100, 107, 305/109, 110, 116, 132, 133

(56) References Cited

U.S. PATENT DOCUMENTS

| 1,992,702 A | * | 2/1935 | Koop |
| 2,049,693 A | * | 8/1936 | Eberhard |
| 2,989,351 A | * | 6/1961 | Deysher et al. |
| 3,053,085 A |   | 9/1962 | Knauth |
| 3,713,661 A | * | 1/1973 | Luthman et al. |
| 3,993,153 A |   | 11/1976 | Hansen et al. |
| 4,097,093 A |   | 6/1978 | Shelby et al. |
| 4,229,053 A |   | 10/1980 | Cline |
| 4,283,093 A |   | 8/1981 | Cline |
| 4,553,790 A |   | 11/1985 | Boggs |
| 5,104,205 A |   | 4/1992 | Motomura et al. |
| 5,873,424 A | * | 2/1999 | Gustafson et al. ........... 180/9.1 |
| 6,247,547 B1 | * | 6/2001 | Lemke et al. ................ 180/9.5 |

FOREIGN PATENT DOCUMENTS

| JP | 59070266 | 4/1984 |
| JP | 10100951 | 4/1998 |

* cited by examiner

*Primary Examiner*—Russell D. Stormer
(74) *Attorney, Agent, or Firm*—Varndell & Varndell, PLLC (57) ABSTRACT

A travel gear of a crawler work vehicle has a plurality of double bogie type track wheel devices. The double bogie type track wheel devices respectively include a first arm member attached to the lower part of a track frame so as to be swingable in the vertical direction, a second arm member whose almost center portion in the longitudinal direction is rotatably attached to the tip of the first arm member, and a pair of front and rear track wheels rotatably attached to front and rear ends of the second arm member and rolling on the tread of a crawler. A pair of first guard devices for preventing intrusion of a foreign matter into a space between the pair of front and rear track wheels and the crawler are attached to both side faces in the width direction of the vehicle of the first arm member.

10 Claims, 8 Drawing Sheets

TRAVEL GEAR OF CRAWLER WORK VEHICLE

BACKGROUND OF THE INVENTION

1. Field of the Invention

The present invention relates to a travel gear of a crawler work vehicle.

2. Description of the Related Art

Figure 6:
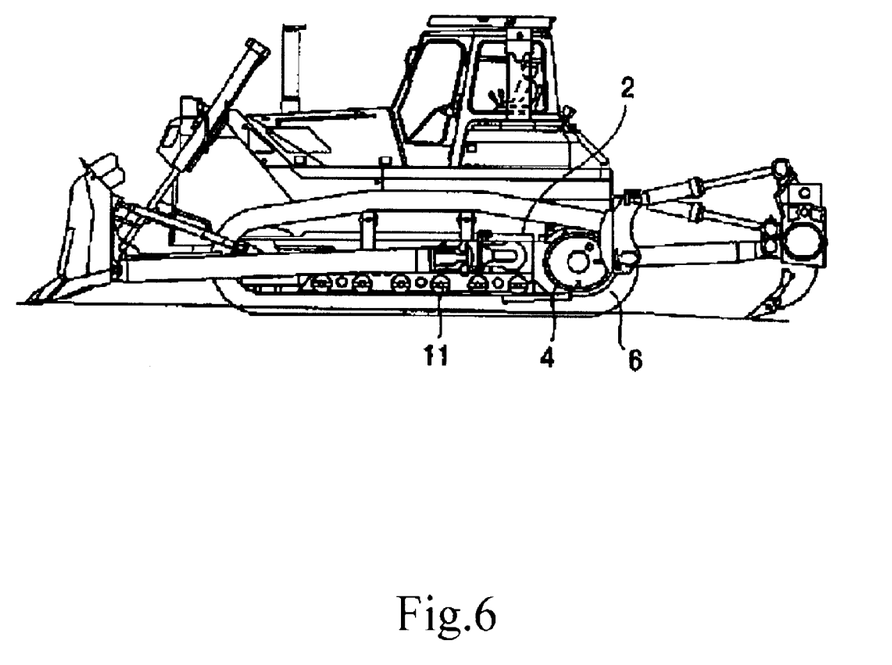
FIG. 6 is a side view of a bulldozer.

A conventional travel gear of a crawler work vehicle can travel, for example as shown in FIG. 6, generally by providing a pair of right and left track frames 2 and 2 in the lower part of the body in the longitudinal direction of the vehicle, rotating a crawler 6 rotatably wound around the track frames 2 via a sprocket 4, and rolling a plurality of track wheels 11 rotatably attached to the lower part of the track frame 2 on the inner face (hereinbelow, called a wheel tread) of the crawler 6.

Figure 7:
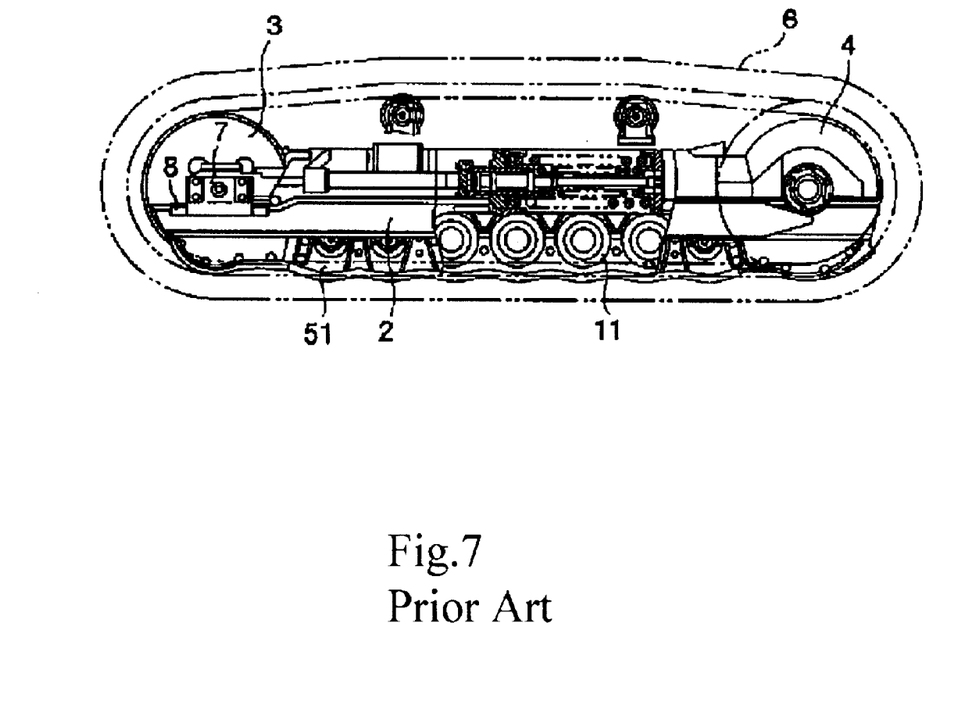
FIG. 7 is a side view of a travel gear according to a first prior art.

FIG. 7 shows a first prior art of such a travel gear, and is a side view of a travel gear having a fixed track wheel disclosed in Japanese Patent Publication No. Sho-63-16313. An idler 3 is rotatably attached to one end in the longitudinal direction of the track frame 2, and the sprocket 4 is rotatably attached to the other end. To brackets fixed to the lower part of the track frame 2, a plurality of fixed track wheels 11 are rotatably attached at predetermined intervals. The crawler 6 is wound around the idler 3, sprocket 4, and track wheels 11, and the track wheels 11 rolls on the tread of the crawler 6. If a foreign matter such as a rock enters between the track wheel 11 and the crawler 6, the track wheel 11 comes off from the crawler 6 or meanders. Consequently, to prevent a foreign matter from entering the space between the track wheel 11 and the crawler 6, a fixed cover 51 covering the outer side face of the plurality of track wheels 11 is integrally attached so as to extend from the idler 3 to the sprocket 4 in the lower part of the track frame 2.

Figure 8:
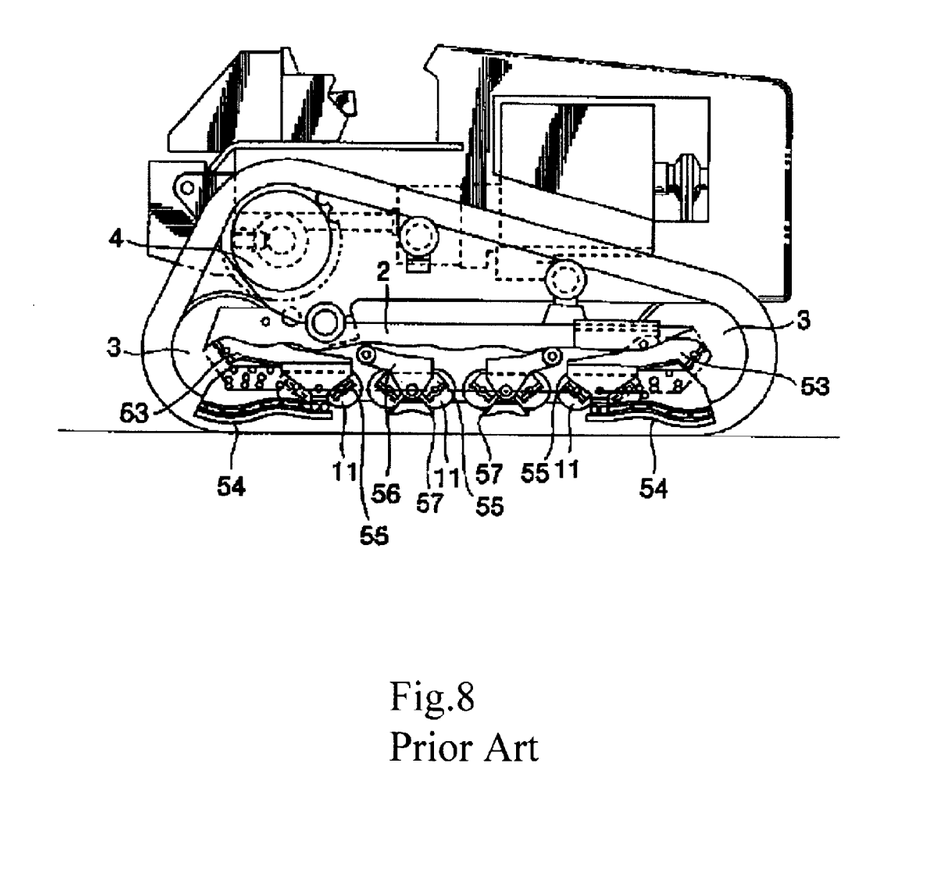
FIG. 8 is a side view of a travel gear according to a second prior art.

On the other hand, a crawler travel device in which a crawler is prevented from coming off by preventing a track wheel from running on the tread of the crawler by making the track wheel follow a change in the vertical direction of the crawler due to rough or uneven terrain at the time of travel, and which realizes stable high-speed driving is also known. FIG. 8 shows a second prior art of the crawler travel device and is a side view of, for example, a travel device having a swingable track wheel disclosed in Japanese Unexamined Patent Application No. Sho-53-53843.

In FIG. 8, at both ends in the longitudinal direction of the track frame 2, idlers 3 and 3 are rotatably attached to one end on the outside of first arms 53 and 53 provided so as to swing vertically, an almost center part of each of second arms 55 and 55 is swingably attached to one end on the inside of each of the first arms 53 and 53, and a pair of front and rear swingable track wheels 11 and 11 are rotatably attached to both front and rear ends of each of the second arms 55 and 55 which are swingable in the vertical direction. In the lower part of the track frame 2 between the front and rear idlers 3 and 3, an almost center part of the second arm 55 is swingably attached to the tip of a third arm 56 provided so as to be vertically swingable, and the pair of front and rear swingable track wheels 11 and 11 are rotatably attached to both front and rear ends of the second arm 55. Further, above the track frame 2, the sprocket 4 is rotatably attached in the rear part of the body. A crawler 6 is wound around the idlers 3 and 3, sprocket 4, and plurality of swingable track wheels 11. An elongated guide member 54 is attached to the lower end of each of the first arms 53 by a bolt. The guide members 54 are positioned on both sides of the crawler width direction so as to be in contact with the outer side faces of a link (not shown) of the crawler 6. Further, an elongated member 57 is attached to the lower end of the third arm 56 by a bolt, positioned along both sides in the crawler width direction, and also positioned so as to be in contact with the link of the crawler 6.

The elongated guide member 54 and elongated member 57 position in the transverse direction of the crawler 6 with respect to the track frame 2 and the track wheels 11 and 11, thereby preventing the crawler from coming off.

In recent years, to prevent the crawler from coming off when a crawler work vehicle such as bulldozer or hydraulic excavator travels on an uneven ground and to assure stability of high-speed travel, a travel gear having a swingable (so-called bogie type) track wheel is often used. Therefore, in the travel gear having the swingable track wheel as well, it is very important to prevent a foreign matter from entering the space between the track wheel and the crawler.

However, in the conventional travel gear having the swingable track wheel 11 described in Japanese Unexamined Patent Application No. Sho-53-53843, although the crawler is prevented from coming off at the time of driving on uneven ground by the guide member 54 and elongated member 57 attached to the lower ends of the arms 53 and 56 which swing vertically so as to follow vertical movement of the crawler 6, since no guard member is provided, intrusion of a foreign matter into the space between the track wheel 11 and the crawler 6 cannot be prevented. Consequently, there is a problem that wear of the crawler link and the track wheel 11 is severe due to the intrusion and the durability is not satisfactory. Since the two swingable track wheels 11 and 11 at both front and rear ends of the track frame 2 and the idler 3 are attached to both ends of the first arm 53, by influence of the vertical movement of the idler 3, the upper and lower positions of the swingable track wheels 11 and 11 at the both rear and front ends and the guide member 54 are determined. It is difficult to prevent coming-off of the crawler at both front and rear ends and intrusion of a foreign matter with reliability.

On the other hand, even if the fixed cover 51 integrally attached to the track frame 2 as used for the travel gear according to the first prior art disclosed in Japanese Patent Publication No. Sho-63-16313 is applied to the travel gear having the swingable track wheel, there is a problem such that when the track wheel 11 is lowered by the swingable arms 53 and 56, the cover 51 cannot sufficiently prevent intrusion of a foreign matter.

As described above, also in the travel gear having track wheels which can swing vertically, development of a travel gear capable of preventing intrusion of a foreign matter into a space between the track wheel and the crawler is strongly demanded.

SUMMARY OF THE INVENTION

The invention has been achieved by paying attention to the problems and its object is to provide a travel gear of a crawler work vehicle capable of preventing intrusion of a foreign matter into a space between a swingable track wheel and a crawler.

To achieve the object, according to the invention, there is provided a travel gear of a crawler work vehicle, in which a pair of right and left track frames are provided in the longitudinal direction in the lower part of the vehicle and a plurality of double bogie type track wheel devices are attached in the lower portion of the track frames, each double bogie type track wheel device including: a first arm member attached to the lower part of the track frame so as to be swingable in the vertical direction; a second arm member of which almost center portion in the longitudinal direction is rotatably attached to a tip of the first arm member so that both front and rear ends of the second arm member are swingable in the vertical direction; and a pair of front and rear track wheels rotatably attached to the front and rear ends of the second arm member and rotating on a tread of a crawler rotatably wound around the track frames, wherein a pair of first guard devices for preventing intrusion of a foreign matter into a space between the pair of front and rear track wheels and the crawler are attached to both side faces in the width direction of the vehicle of the first arm member.

According to the invention, the guard device is attached to each of the right and left side faces (inside and outside of the vehicle body) of the first arm member of each double bogie type track wheel device and intrusion of a foreign matter into a space between the pair of track wheels attached to the front and rear ends of the second arm member and the crawler is prevented by the guard device. Consequently, even when the track wheels move vertically in association with swing of the first and second arm members, intrusion of a foreign matter is prevented with reliability. Therefore, wear of the crawler link of the travel gear having bogie type track wheels and the track wheels is prevented, so that durability can be improved, and the crawler can be prevented from coming off.

In the invention, the first guard devices may have a size covering almost the whole swing range of at least the outside diameters of the pair of front and rear track wheels in association with vertical swing of the second arm member in cross section.

With the configuration, since the guard devices attached to the first arm member have the size covering almost the whole swing range of at least the outside diameters of the pair of front and rear track wheels in cross section even when the second arm member moves vertically, intrusion of a foreign matter can be prevented with reliability irrespective of vertical movement of the track wheels.

Further, in the invention, the first guard device may be formed almost in a plate shape, a lower end in cross section of the first guard device may be positioned at the level of almost the center of a link pin of the crawler on plain land, and a crawler link guide for guiding the link of the crawler may be attached to the lower part of the first guard device.

With the configuration, since the first guard device is formed almost in a plate shape, it can be manufactured with a simple structure at low cost. Since the lower end of the guard device is positioned at the level of almost the center of the link pin of the crawler on plain land, even when the track wheels swing downward, a foreign matter does not easily enter the space between the crawler and the track wheel, so that intrusion of a foreign matter can be prevented with a simple structure. Further, the crawler link is guided by the crawler link guide attached to the lower part, so that the crawler can be prevented from coming off with reliability.

According to another invention, a pair of right and left second guide devices are attached to a lower end portion of the track frame between neighboring two track wheels attached to different second arm members of two double bogie type track wheel devices.

According to the invention, by covering the gap between the two neighboring track wheels attached to different second arm members of two double bogie type track wheel devices with the second guide devices, intrusion of a foreign matter from the gap is prevented. Therefore, by using both the first guard device swingable corresponding to the bogie type track wheel and the fixed-type second guard device, an effect at preventing intrusion of a foreign matter is obtained in the whole area of the track frame.

In the invention, the second guide devices may have areas overlapped with the first guide devices of neighboring double bogie type track wheel devices at least at front and rear ends in cross section on plain land.

With the configuration, since at least the front and rear ends of the first and second guide devices are overlapped in cross section on plain land, even if the first guide device moves vertically, no gap is created between the devices, so that intrusion of a foreign matter can be prevented with reliability in the whole area of the track frame. In the overlapped area, by deviating the first and second guide devices to the outside and inside of the crawler, interference can be eliminated.

In any of the inventions, an idler and a sprocket may be attached on an almost extension line in the longitudinal direction of the track frame so that their attachment positions in the vertical direction are fixed.

With the configuration, the idler and the sprocket are attached linearly on an almost extension line in the longitudinal direction of the track frame. Moreover, by applying the invention to a travel gear in which the attachment positions in the vertical direction are fixed, to be specific, a travel gear which does not have the configuration that the track wheel and the idler are attached swingable in the vertical direction by an arm as described in the prior art, a higher effect is obtained. That is, without being influenced by the vertical swing of the idler, the track wheels always move vertically so as to follow a change in the vertical direction of the crawler, and moreover, even when the track wheel moves vertically, the swingable guard device follows the vertical movement and guards the track wheel. Therefore, also in the travel gear of a crawler work vehicle having bogie type track wheels, intrusion of a foreign matter into the space between the crawler and the track wheels can be prevented.

DETAILED DESCRIPTION OF THE INVENTION

Embodiments will be described in detail hereinbelow with reference to the drawings.

As an example of a crawler work vehicle to which a travel gear according to the invention is applied, a bulldozer as shown in FIG. 6 will be described.

Figure 1:
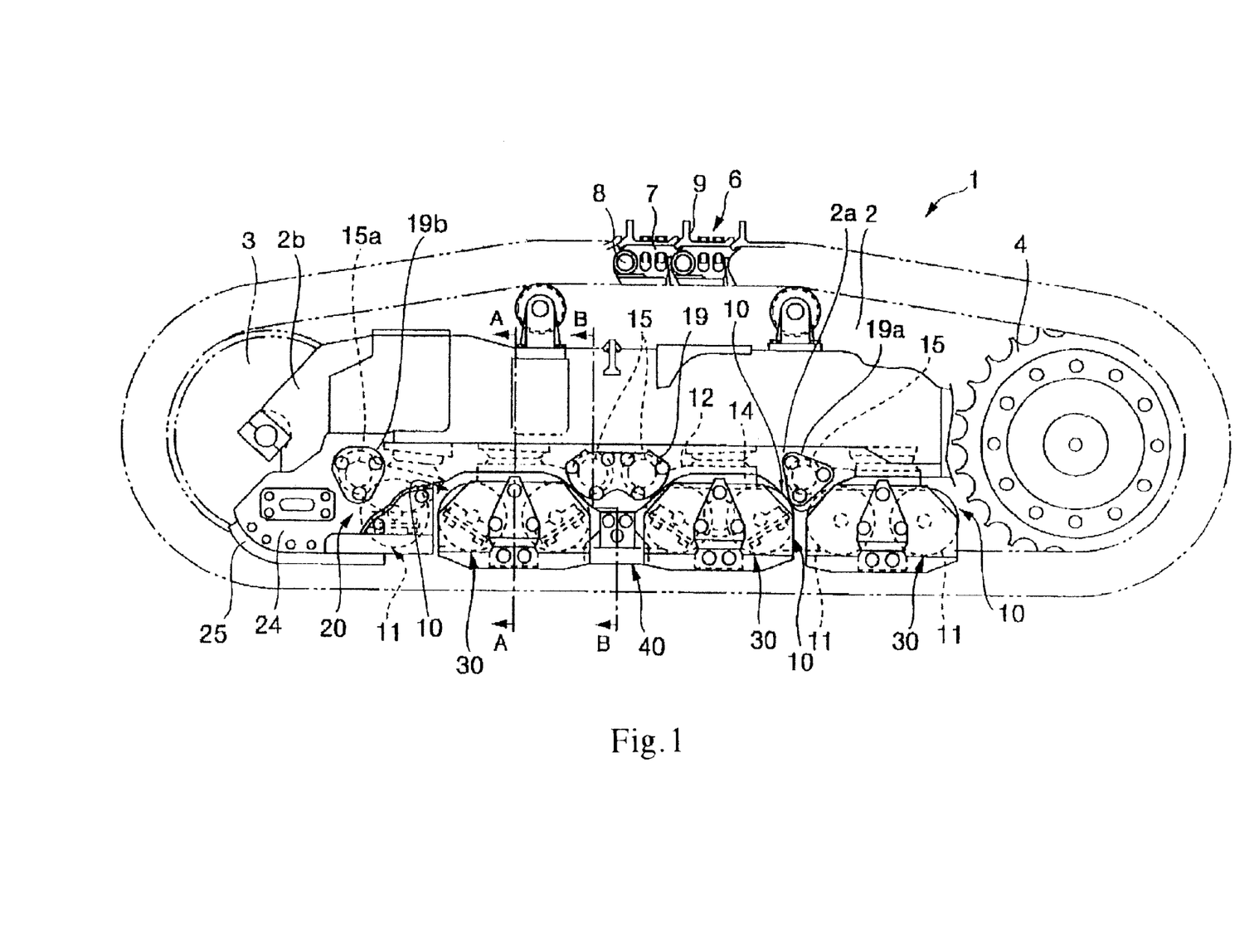
FIG. 1 is a side view of a travel gear of an embodiment.

FIG. 1 is a side view of the travel gear of the embodiment.

In FIG. 1, a crawler vehicle has a pair of right and left travel gears 1 and 1 each having a crawler 6 as shown in the diagram in the lower part of the vehicle. The travel gear 1 has a track frame 2 disposed in the longitudinal direction of the vehicle and an idler 3 and a sprocket 4 rotatably attached to both front and rear ends of the track frame 2. Between the idler 3 and the sprocket 4, in the lower part of track frame 2, a plurality (three in the embodiment) of double bogie type track wheel devices 10 each having a pair of track wheels 11 and 11 rotatably supported so as to be swingable in the vertical direction and a single bogie type track wheel device 20 having a track wheel 11 rotatably supported so as to be swingable in the vertical direction are provided. Further, a pair of first guard devices 30 and 30 covering both side faces to prevent intrusion of a foreign matter to a space between the pair of front and rear track wheels 11 and 11 and the crawler 6 are provided on both inside and outside of each of the double bogie type track wheel devices 10. Between two neighboring double bogie type track wheel devices 10 and 10 provided in the center portion in the longitudinal direction of the travel gear 1, a pair of second guard devices 40 and 40 for preventing intrusion of a foreign matter into a space between the neighboring track wheels 11 and 11 and the crawler 6 are provided on both sides in the width direction of the crawler 6.

A yoke 2b to which a predetermined tension is applied outward in the longitudinal direction via a not-illustrated spring is attached to one end in the longitudinal direction of the vehicle of the track frame 2 so as to be movable in the longitudinal direction, and the idler 3 is rotatably attached to the tip of the yoke 2b.

A pair of right and left brackets 2a and 2a are integrally attached by welding or the like in the lower parts of side ends in the width direction of the vehicle of the track frame 2. First swing pins 15 of the three double bogie type track wheel devices 10 are attached to the right and left brackets 2a and 2a nearer to the center portion in the longitudinal direction of the travel gear 1 than the track wheel 11. A pair of first guard devices 30 and 30 is attached on both side faces on the outside and inside of the vehicle of the tip of a first arm member 12 attached to the first swing pin 15 swingably in the vertical direction so as to cover the portion between the pair of front and rear track wheels 11 and 11 and the right and left side faces of the track wheels 11 and 11. At the lower ends of the right and left brackets 2a and 2a positioned below the two first swing pins 15 and 15 attached close to an almost center portion in the longitudinal direction of the travel gear 1, the pair of second guard devices 40 and 40 covering the portion between the neighboring two double bogie type track wheel devices 10 and 10 from both of the inside and outside of the vehicle body are provided.

The single bogie type track wheel device 20 is provided in a position closest to the idler 3, and a swing pin 15a is attached in a position near to the idler 3 more than the track wheel 11. A pair of guard members 24 and 24 are integrally attached to right and left lower portions of one end on the idler 3 side of the track frame 2. The pair of right and left guard members 24 and 24 are formed so as to cover side face portions of the idler 3 and the track wheel 11 of the single bogie type track wheel device 20 for a predetermined distance from the front end portion of the track frame 2 to the rear. Track guards 25 and 25 are attached to the lower ends of the pair of right and left guard members 24 and 24 by bolts so as to be close to right and left ends of a link 7 of the crawler 6.

The track wheels 11 of the double bogie type track wheel devices 10 and single bogie type track wheel device 20 are in contact with and roll on the tread of the links 7 of the crawler 6 constructed by annularly connecting the links 7, to which track plates 9 are fastened by bolts, by link pins 8.

Figure 2:
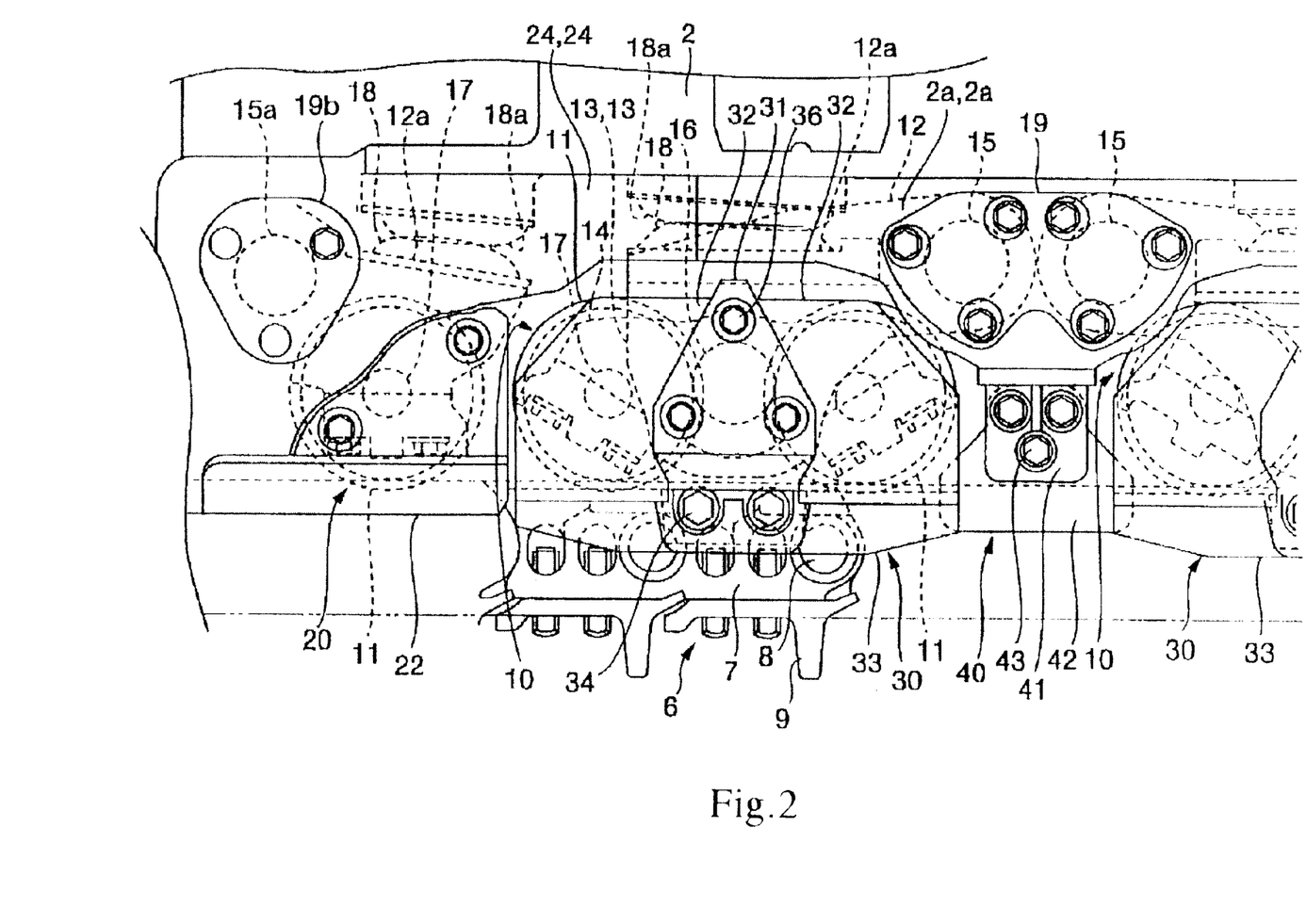
FIG. 2 is a detailed view of a main portion of the travel gear of the embodiment.
Figure 3:
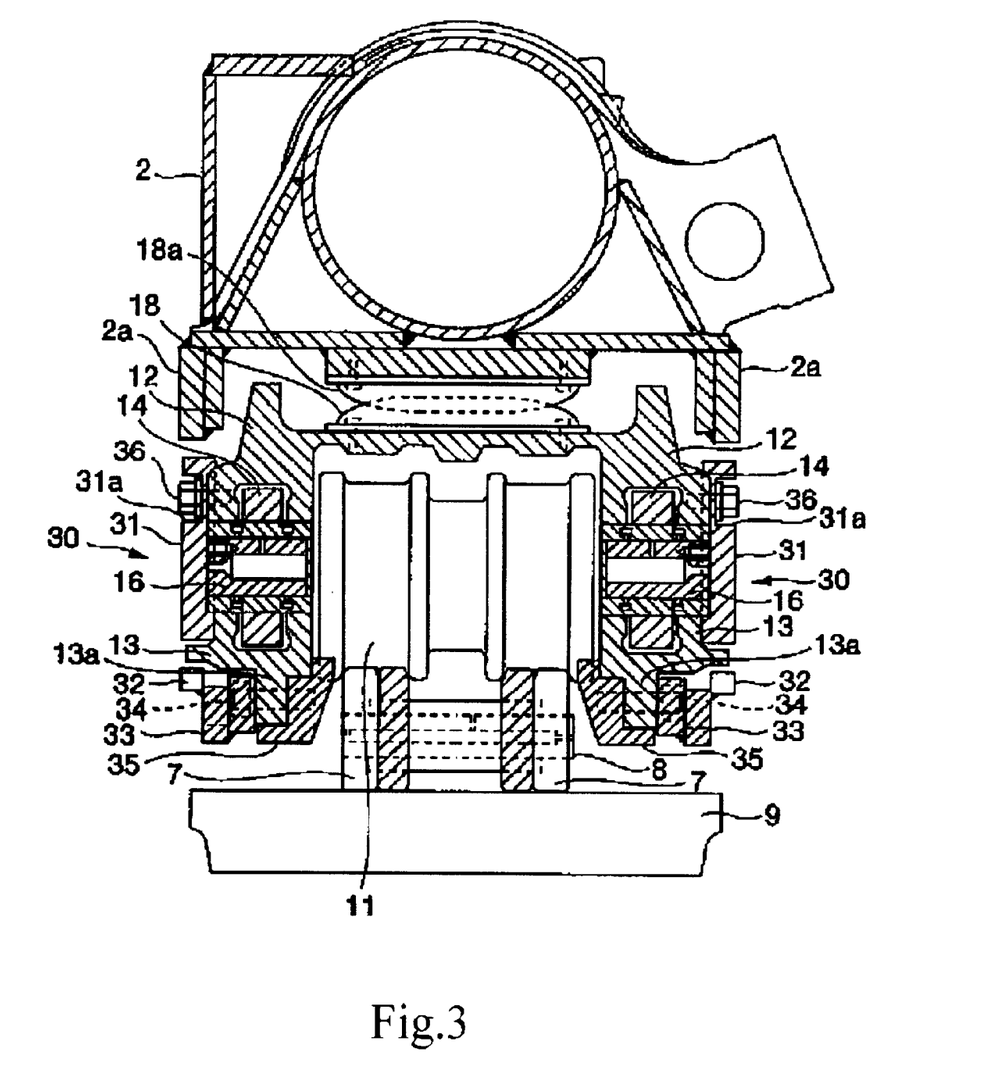
FIG. 3 is a cross section taken along line A—A of FIG. 1.
Figure 4:
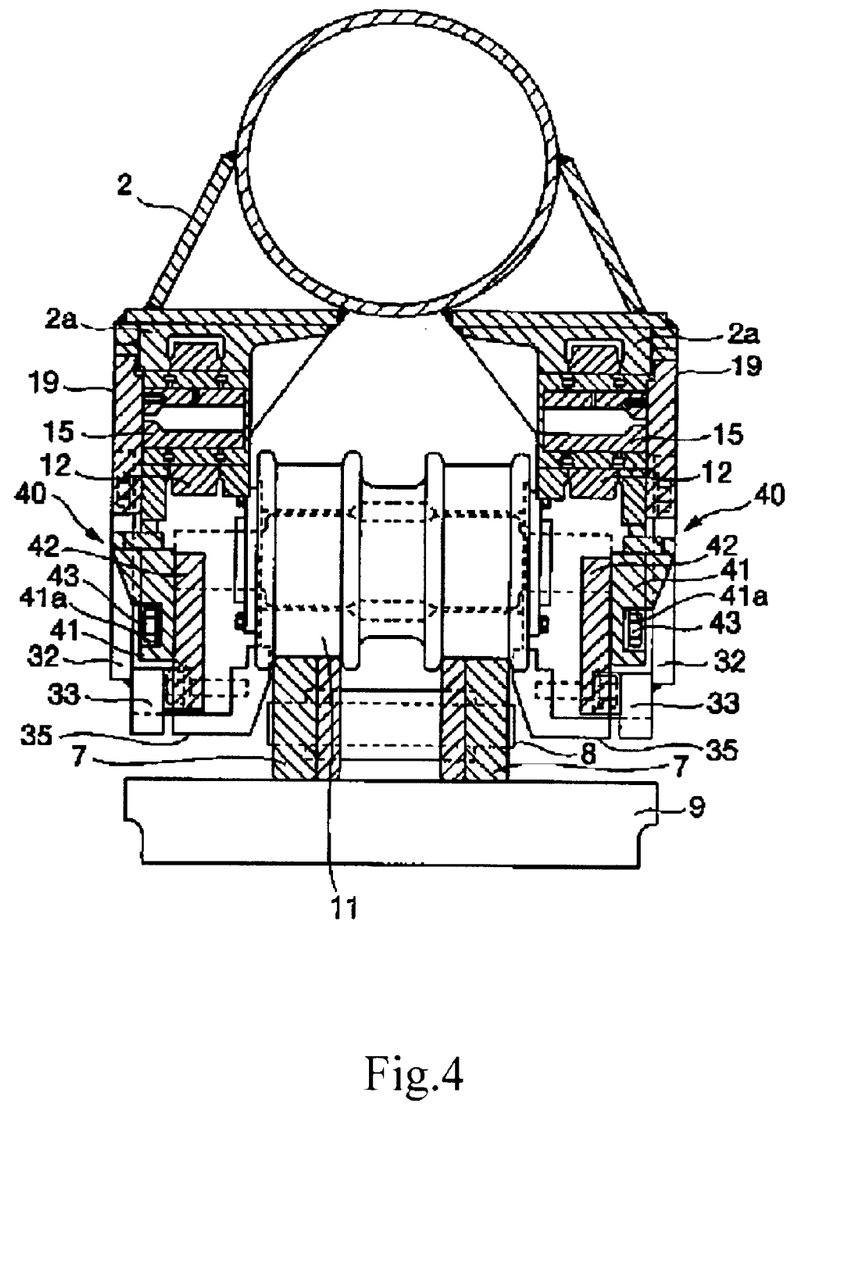
FIG. 4 is a cross section taken along line B—B of FIG. 1.

With reference to FIGS. 2, 3, and 4, the details of the double bogie type track wheel device 10, first guard device 30, second guard device 40, and single bogie type track wheel device 20 will be described. FIG. 2 is a detailed side view of the main portion of the travel gear. FIG. 3 is a cross section taken along line A—A of FIG. 1, and FIG. 4 is a cross section taken along line B—B of FIG. 1.

As shown in FIGS. 2 and 4, the double bogie type track wheel device 10 has the first arm member 12 attached to a pair of right and left brackets 2a and 2a attached to the lower parts of both ends in the width direction of the vehicle of the track frame 2 by welding or the like by the pair of right and left first swing pins 15 and 15, so as to be swingable in the vertical direction. To the outer side faces of the right and left brackets 2a and 2a, a dropout preventing plate 19 (or a dropout preventing plate 19a shown in FIG. 1) covering the outer ends of the pair of right and left first swing pins 15 and 15 is attached. As shown in FIGS. 2 and 3, supporting parts 13 and 13 extending downward are formed on the right and left sides of the tip of the first arm member 12. The center portions of the right and left second arm members 14 and 14 are attached to the supporting parts 13 and 13 by second swing pins 16 and 16 so as to be vertically swingable. The pair of front and rear track wheels 11 and 11 are attached rotatably by pins 17 and 17 between the front ends and between the rear ends of the pair of right and left second arm members 14 and 14.

An elastic member 18 is attached to the upper portion of the tip of the first arm member 12, and an elastic member 18a is attached to the under face portion of the track frame 2 facing the elastic member 18. The elastic members 18 and 18a come into contact with each other when the first arm member 12 swings, thereby regulating upward swing of the first arm member 12, and absorbing an impact to the track wheel 11 when the travel gear 1 runs on or over rough and uneven terrain.

As shown in FIGS. 2 and 3, the guard device 30 has: a center member 31 provided so as to cover the inside and outside of the body to prevent dropout of ends of the two swing pins 16 and 16 provided on the inside and outside of the body; side-face members 32 and 32 fixed to both side faces in the longitudinal direction (transverse direction in FIG. 2) of the center member 31 by welding or the like and provided so as to cover the side faces of the track wheels 11; and a lower-part member 33 fixed to the lower part of the side-face members 32 and 32 from the inside in the width direction of the track frame 2 by welding or the like and provided so as to cover the space between the track wheels 11 and the lower parts of the track wheels 11. The center member 31 is attached to the outer face of the supporting part 13 of the first arm member 12 by bolts 36 around the second swing pin 16. In this state, the lower-part member 33 has a length so that its lower end is positioned at the level which is almost at the center of the link pin 8 of the crawler 6. Both of the side-face members 32 and 32 have the size covering almost the whole swing range at the time the pair of track wheels 11 and 11 swing in the vertical direction via the second arm members 14 and 14.

The center member 31 has a recess 31a around a bolt hole so that the head of the bolt 36 is in the position lower than the level of the outer face of the center member 31. The recess 31a has a role of improving durability by reducing wear caused by contact between the head of the bolt 36 with a rock or the like.

A projection 13a projected downward is formed at the lower end of the supporting part 13. A crawler link guide 35 having an almost L shape in cross section in contact with the inner face of the projection 13a is attached to the lower-part member 33 via the projection 13a with a bolt 34. The crawler link guide 35 having an almost L shape in cross section is attached so that a part of the L shape is upright and the other part extends outward. Faces opposite to each other (faces facing inward of the track frame 2) of the upright parts of the pair of right and left crawler link guides 35 and 35 are tapered, and the tapered faces are in contact with the links 7 of the crawler 6. The lower-part member 33 has a recess around the bolt hole so that the head of the bolt 34 is recessed from the outer face of the lower-part member 33. The tapered face of the crawler link guide 35 is positioned near the side end of the link 7 of the crawler 6 so that its lower end is positioned in an almost center of the link pin 8. By making the tapered faces of the pair of right and left crawler link guides 35 and 35 contact with the link 7, deviation in the transverse direction of the crawler 6 is regulated.

As shown in FIG. 2, the first swing pins 15 and 15 of the two double bogie type track wheel devices 10 and 10 provided so as to be adjacent to each other near to the center in the longitudinal direction of the travel gear 1 are provided so as to be close to each other. As shown in FIGS. 2 and 4, a guard device 40 is provided at the lower ends of right and left brackets 2a and 2a positioned below the first swing pins 15 and 15. The guard device 40 has an attachment member 41 and a guard plate 42. The attachment members 41 are fixed to the lower ends of the right and left brackets 2a and 2a by welding or the like, and the guard plate 42 is attached to the inner face of the attachment member 41 by bolts 43. In this attachment state, the guard plate 42 is positioned on the inner side of the lower-part member 33 of the guard device 30. Moreover, as shown in FIG. 2, on plain land, the front and rear ends of the guard plate 42 are partially overlapped with the guard devices 30 and 30, and the lower end of the guard plate 42 is at almost the same level as the lower end of the lower-part member 33 of each of the guard device 30. The attachment member 41 has the recess 41a around the bolt hole so that the head of the bolt 43 is in the position lower than the level of the outer face of the attachment member 41.

Although the guard plate 42 is provided so as to be positioned on the inside of the lower-part member 33 of the guard device 30 in the embodiment, it can be provided on the outside of the lower-part member 33.

The single bogie type track wheel device 20 provided in the position closest to the idler 3 has, as shown in FIG. 2 in a manner similar to the first arm member 12, an arm member 12a attached to the pair of right and left guard members 24 and 24 provided in the front end portion of the track frame 2 via the pair of right and left swing pins 15a and 15a so as to be swingable in the vertical direction. The track wheel 11 is rotatably attached to the lower part of the tip of the arm member 12a by the pin 17. The elastic member 18 is attached to the top face of the tip of the arm member 12a, and the elastic member 18a is attached to the under face portion of the track frame 2 facing the elastic member 18. When the elastic members 18 and 18a come into contact with each other, the upward swing of the arm member 12a is regulated and an impact to the track wheel 11 when the travel gear 1 runs on or over rough and uneven terrain is absorbed. Further, covers 22 and 22 covering both side faces in the crawler width direction of the track wheel 11 are attached to the lower parts of the guard members 24 and 24 positioned near the track wheel 11 of the single bogie type track wheel device 20, and the guard members 24 and 24 and covers 22 and 22 are provided so as to cover almost the whole swing range of the track wheel 11.

The action and effects of the above configuration will now be described.

Figure 5:
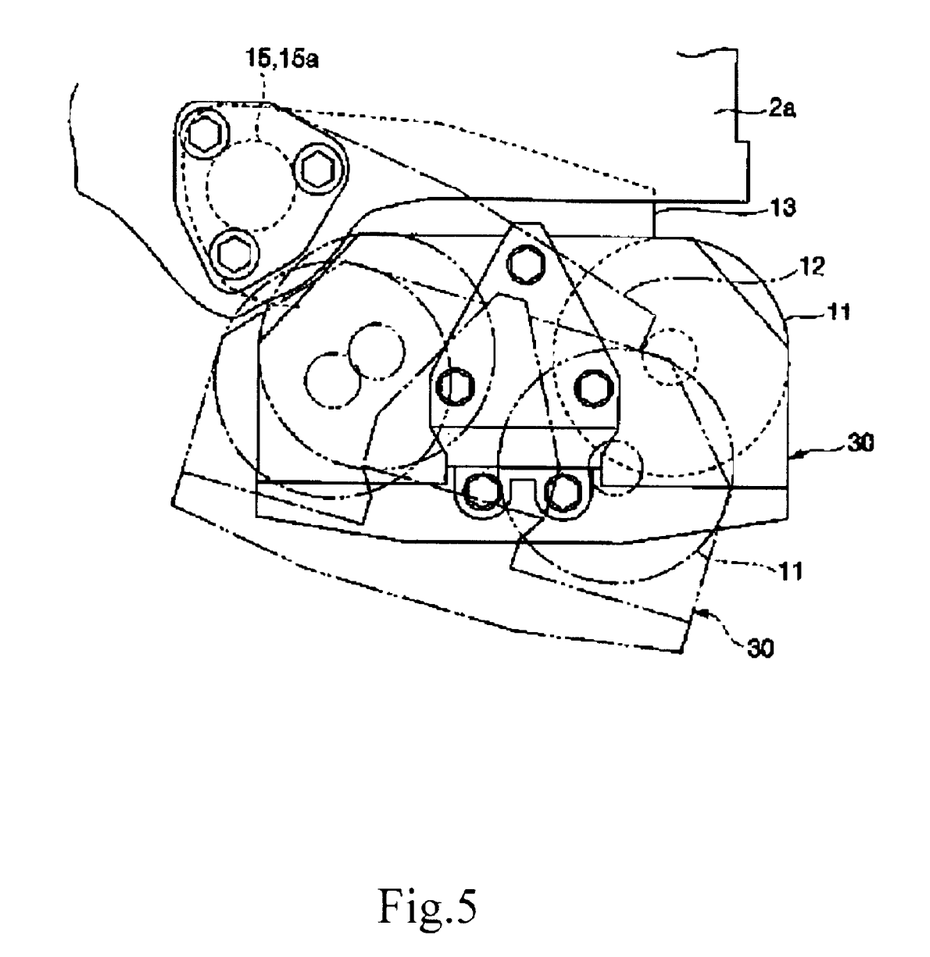
FIG. 5 is a diagram for explaining the action of a guard device.

Since the guard device 30 of the double bogie type track wheel device 10 is attached to the first arm member 12, even when the first arm member 12 swings in the vertical direction between the upper end position expressed by the solid line and the lower end position expressed by the alternate long and two short dashes line as shown in FIG. 5, the guard device 30 also swings together with the swing, so that the space between the pair of front and rear track wheels 11 and 11 and the portions around the track wheels 11 and 11 are always covered with the guard devices 30 and 30. Moreover, the guard device 30 has a size sufficiently covering almost the whole swing range even when the pair of front and rear track wheels 11 and 11 swing around the second swing pin 16. Therefore, even when the track wheels 11 swing via the first and second arm members 12 and 14, intrusion of a foreign matter such as a rock into the space between the crawler 6 and the track wheels 11 from the space between the pair of front and rear track wheels 11 and 11 and the portions around the track wheels 11 and 11 can be prevented. Thus, the crawler can be prevented from coming off at the time of travel on rough and uneven terrain, and wear of the link 7 of the crawler 6 and the track wheel 11 due to intrusion of a foreign matter such as a rock can be prevented, so that the durability can be improved.

Since the lower end of the lower-part member 33 of the guard device 30 is provided so as to be almost in the center of the link pin 8 of the crawler 6, the guard device 30 extends to a position lower than the track wheel 11, so that a foreign matter does not easily enter. Thus, intrusion of a foreign matter can be prevented with reliability. Since the tapered face of the crawler link guide 35 attached to the inside of the lower end of the lower-part member 33 is positioned near the side end of the link 7 of the crawler 6, deviation in the transverse direction of the link 7 can be prevented and the gap between the lower-part member 33 and the link 7 can be closed. Therefore, intrusion of a foreign matter to the gap between the pair of front and rear track wheels 11 and 11 from below of the lower-part member 33 can be prevented by the crawler link guide 35. Further, since the lower end of the tapered face is lowered to almost the center position of the link pin 8, intrusion of a foreign matter from below of the lower-part member 33 can be prevented with reliability.

Since the guard device 30 is formed in an almost plate shape by the center member 31, side-face members 32 and 32, and lower-part member 33, it can be manufactured at low cost with a simple structure. An attachment hole for the bolt 36 formed in the center member 31 has the same configuration (hole diameter and hole position) as that of the attachment hole of the dropout preventing plate of the second swing pin 16 used for the conventional travel gear to which the guard device 30 is not attached. Consequently, the dropout preventing plate of the second swing pin 16 of the conventional travel gear and the guard device 30 can be easily replaced with each other. Since the guard device 30 can be attached at a site after shipment of the crawler work vehicle, a maintenance service work is easy.

The fixed-type guard device 40 is provided in the gap between the two sets of front and rear guard devices 30 and 30 which are swingable in the vertical direction, and the guard plate 42 of the guard device 40 covering the gap is provided on the inside of the guard device 30 so that the guard plate 42 does not interfere with the side-face members 32 and 32 of the front and rear guard devices 30 and 30 and the lower-part members 33 and 33. Moreover, when the guard device 30 in at the swing upper end position, the front and rear ends of the guard plate 42 are partially overlapped with the guard device 30. Even when the guard device 30 swings downward, the overlapped area can be always assured. Therefore, even when the track wheels 11 of the double bogie type track wheel device 10 swing, the gap sandwiched by the two guard devices 30 and 30 can be always covered with the guard device 40, so that intrusion of a foreign matter from the gap can be prevented. Since the lower end of the guard plate 42 of the guard device 40 is lowered to almost the same level as the lower end of the lower-part member 33 of the guard device 30, that is, a position almost the center of the link pin 8, intrusion of a foreign matter can be prevented more reliably. Further, in the embodiment, the guard plate 42 of the guard device 40 is provided on the inner side of the front and rear guard devices 30, wear of the guard plate 42 due to contact with a rock or the like is lessened.

The pair of right and left track guards 25 and 25 attached to one end on the idler 3 side of the track frame 2 sandwich the link 7 of the crawler 6 from both of the outside and inside of the body. The pair of right and left guard members 24 and 24 and covers 22 and 22 cover the idler 3 and the side face of the track wheel 11 of the single bogie type track wheel device 20, thereby preventing intrusion of a foreign matter from the gap between the idler 3 and the track wheel 11.

Since the guard device 30, guard plate 42 of the guard device 40, crawler link guide 35, and track guide 25 are detachably attached by bolts or the like, they can be easily replaced when worn.

The idler 3 is attached on the extension line in the longitudinal direction of the track frame 2 so as to fix the attachment position in the vertical direction, that is, the idler 3 is not attached to the arm swingable in the vertical direction as described in the prior art. Consequently, the track wheels 11 of the double bogie type track wheel device 10 and single bogie type track wheel device 20 can independently swing so as to follow a change in the vertical direction of the crawler 6 without being influenced by the vertical motion of the idler 3. Moreover, a larger bogie stroke can be obtained by the first and second arm members 12 and 14, so that follow-up performance to the crawler 6 is very excellent. For example, even if the crawler 6 near the lower part of the sprocket 4 is largely deflected when the vehicle runs on rough and uneven terrain during reverse travel, the track wheel 11 immediately follows the crawler 6 and is not apart from the crawler 6. In a travel gear of a crawler work vehicle having bogie type track wheels capable of independently moving vertically, by attaching the guard device 30 which swings in association with vertical movement of the track wheel 11, in overall length of the track frame 2 extending from the idler 3 to the sprocket 4, intrusion of a foreign matter to the space between the crawler 6 and the track wheel 11 can be particularly effectively prevented.

Consequently, even when the vehicle travels on rough ground having a large hole or bump in the rough and uneven terrain, the track wheels 11 follow and contact with the tread of the crawler 6, so that the vehicle does not run on rough and uneven terrain, occurrence of coming-off of the crawler can be prevented, and ride comfort can be improved. The amount of handling rough and uneven terrain by the crawler 6 increases and the track wheels 11 always support the body, so that an impact given after the vehicle runs over rough and uneven terrain can be lessened and durability and ride comfort of the vehicle can be improved. Further, the actual ground length between the idler 3 and the sprocket 4 is stable, so that shoe slip is prevented and highly tractional force can be obtained.

Although the case where the guard plate 42 of the guard device 40 is provided on the inner side of the front and rear guard devices 30 has been described in said embodiment, the invention is not limited to the configuration but the guard plate 42 may be provided on the outside of the guard device 30. That is, in the overlapped region of the guard devices 30 and 40, it is sufficient to prevent interference by deviating both the guard devices 30 and 40 to the inner and outer sides of the crawler.

The attachment position of the fixed-type guard device 40 is not limited to that in said embodiment. To be specific, in said embodiment, the first swing pins 15 of the neighboring two double bogie type track wheel devices 10 and 10 are attached close to each other, and the fixed-type guard device 40 is attached below the first swing pins 15 and 15. The invention is not limited to the disposition of the first swing pins 15 and 15 and can be applied to a case where the first swing pins 15 and 15 are disposed so as to interchange with each other, or a case where one of the first swing pins 15 and the other track wheel 11 side are disposed so as to be close to each other. In short, it is sufficient to provide the fixed-type guard device 40 between the neighboring two track wheels 11 and 11 attached to the different second arm members 14 of the two double bogie type track wheel devices 10 and 10.

Although the example of the travel gear having the plurality of double bogie type track wheel devices 10 and one single bogie type track wheel device 20 has been described in said embodiment, the invention is not limited to the example. Obviously, the invention can be also applied to a travel gear having only double bogie type track wheel devices 10.

As described above, according to the invention, in the travel device having the bogie type track wheels, by the guard device provided for each bogie type track wheel which swings in the vertical direction in association with the vertical movement of the track wheel, intrusion of a foreign matter into the space between the track wheel and the crawler is prevented, so that even if the track wheel moves vertically, intrusion can be prevented with reliability. Consequently, wear of the crawler link and the track wheel can be reduced, the durability can be largely improved, and the crawler can be also prevented from coming off. Since the gap sandwiched by neighboring two bogie type track wheels is covered with the fixed guard device, by using both the vertically-swingable guard device and the fixed guard device, intrusion of a foreign matter can be prevented for overall length of the track frame, so that improvement in durability of the crawler link and the track wheel and prevention of the crawler from coming off can be realized with reliability. Further, by applying the invention to the travel gear having the bogie type track wheel which independently moves in the vertical direction without being influenced by the vertical movement of the idler, intrusion of a foreign matter can be prevented with reliability by using the vertical movement of the track wheel. Thus, particularly excellent effect can be obtained. As a result, the travel gear of the crawler work vehicle with improved performance of follow-up to the crawler of the track wheel and high tractive force, capable of preventing the crawler from coming off and obtaining improved durability and ride comfort with reliability by reduced shock at the time of travel on rough and uneven terrain can be realized.

What is claimed is:

1. A travel gear of a crawler work vehicle, comprising:
   a track frame extending in a longitudinal direction of the vehicle and provided in a lower part of a vehicle body;
   a plurality of double bogie track wheel devices attached in a lower portion of the track frame;
   a crawler rotatably wound around the track frame;
   a sprocket for rotating the crawler; and
   an idler for guiding rotation of the crawler,
   wherein each of the plurality of double bogie track wheel devices comprises:
      a first arm member attached to the lower part of the track frame so as to be swingable in a vertical direction;
      a second arm member extending in the longitudinal direction of the track frame, the second arm having a center portion rotatably attached to a tip of the first arm member so that front and rear ends of the second arm member are swingable in the vertical direction;
      a pair of front and rear track wheels rotatably attached to the front and rear ends of the second arm member and rotating on a tread of the crawler; and
      a pair of first guard devices attached to side faces of the first arm member in a widthwise direction of the vehicle to thereby prevent intrusion of a foreign matter into a space between the pair of front and rear track wheels and the crawler.

2. The travel gear of a crawler work vehicle according to claim 1, wherein an idler and a sprocket are attached on an extension line parallel to the longitudinal direction of the track frame so that their attachment positions in the vertical direction are fixed.

3. The travel gear of a crawler work vehicle according to claim 1, wherein the first guard devices have a size covering a swing range of at least the outside diameters of the pair of front and rear track wheels in association with vertical swing of the second arm member in cross section.

4. The travel gear of a crawler work vehicle according to claim 3, wherein an idler and a sprocket are attached on an extension line parallel to the longitudinal direction of the track frame so that their attachment positions in the vertical direction are fixed.

5. The travel gear of a crawler work vehicle according to claim 1, wherein the first guard device is formed in a plate shape, a lower end in cross section of the first guard device is positioned at a level of a center portion of a link pin of the crawler on plain land, and a crawler link guide for guiding the link of the crawler is attached to the lower part of the first guard device.

6. The travel gear of a crawler work vehicle according to claim 5, wherein an idler and a sprocket are attached on an extension line parallel to the longitudinal direction of the track frame so that their attachment positions in the vertical direction are fixed.

7. The travel gear of a crawler work vehicle according to claim 1, wherein a pair of right and left second guide devices are attached to a lower end portion of the track frame between adjacent track wheels attached to different second arm members of two double bogie track wheel devices.

8. The travel gear of a crawler work vehicle according to claim 7, wherein an idler and a sprocket are attached on an extension line parallel to the longitudinal direction of the track frame so that their attachment positions in the vertical direction are fixed.

9. The travel gear of a crawler work vehicle according to claim 7, wherein the second guide devices have an area overlapped with the first guide devices of adjacent double bogie track wheel devices at least at front and rear ends in cross section on plain land.

10. The travel gear of a crawler work vehicle according to claim 9, wherein an idler and a sprocket are attached on an extension line parallel to the longitudinal direction of the track frame so that their attachment positions in the vertical direction are fixed.

* * * * *